(12) United States Patent
Tanaka

(10) Patent No.: US 11,482,877 B2
(45) Date of Patent: Oct. 25, 2022

(54) ELECTRONIC DEVICE, CHARGING CONTROL METHOD, AND COMPUTER PROGRAM

(71) Applicant: Sony Corporation, Tokyo (JP)

(72) Inventor: Go Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 16/979,173

(22) PCT Filed: Jan. 16, 2019

(86) PCT No.: PCT/JP2019/001126
§ 371 (c)(1),
(2) Date: Sep. 9, 2020

(87) PCT Pub. No.: WO2019/176269
PCT Pub. Date: Sep. 19, 2019

(65) Prior Publication Data
US 2020/0412156 A1 Dec. 31, 2020

(30) Foreign Application Priority Data
Mar. 16, 2018 (JP) .............................. JP2018-050230

(51) Int. Cl.
*H02J 7/00* (2006.01)
*H01M 10/44* (2006.01)
(Continued)

(52) U.S. Cl.
CPC ..... *H02J 7/007194* (2020.01); *H01M 10/443* (2013.01); *H01M 10/486* (2013.01);
(Continued)

(58) Field of Classification Search
CPC .............. H02J 7/007194; H02J 7/0047; H02J 7/00712; H02J 7/007; H01M 10/443;
(Continued)

(56) References Cited

U.S. PATENT DOCUMENTS

| 2005/0134221 A1* | 6/2005 | Wanibuchi | ............ H02J 7/0071 320/128 |
| 2008/0007223 A1 | 1/2008 | Morioka | |

(Continued)

FOREIGN PATENT DOCUMENTS

| JP | 2005-192383 A | 7/2005 |
| JP | 2008-005644 A | 1/2008 |
| JP | 2012-055092 A | 3/2012 |

OTHER PUBLICATIONS

International Search Report and Written Opinion dated Feb. 12, 2019 for PCT/JP2019/001126 filed on Jan. 16, 2019, 7 pages including English Translation of the International Search Report.
(Continued)

*Primary Examiner* — Nha T Nguyen
(74) *Attorney, Agent, or Firm* — Xsensus LLP

(57) ABSTRACT

An electronic device is provided that enables a secondary battery to be used until the end of an assumed battery life by appropriately setting charging conditions in accordance with an environment in which the secondary battery has been used. An electronic device is provided that includes: a measurement unit that measures an operation environment of a secondary battery; and a controller that reduces a charging voltage of the secondary battery by a predetermined amount, when the operation environment satisfies a predetermined condition.

16 Claims, 4 Drawing Sheets

(51) Int. Cl.
*H01M 10/48* (2006.01)
*H01M 10/0525* (2010.01)

(52) U.S. Cl.
CPC ........ *H02J 7/0047* (2013.01); *H02J 7/00712* (2020.01); *H01M 10/0525* (2013.01); *H01M 2220/30* (2013.01)

(58) Field of Classification Search
CPC .......... H01M 10/486; H01M 10/0525; H01M 2220/30; H01M 10/48; Y02E 60/10
See application file for complete search history.

(56) References Cited

U.S. PATENT DOCUMENTS

| | | | | |
|---|---|---|---|---|
| 2012/0049804 | A1* | 3/2012 | Kobayashi | H01M 10/441 320/150 |
| 2015/0276881 | A1* | 10/2015 | Liu | G01R 31/3648 324/426 |
| 2016/0091573 | A1* | 3/2016 | Shiraishi | G01R 31/389 324/426 |
| 2017/0338668 | A1* | 11/2017 | Sada | H02J 7/0068 |
| 2018/0226695 | A1* | 8/2018 | Miyaki | H01M 10/443 |
| 2020/0373779 | A1* | 11/2020 | Arizono | H02J 7/0048 |

OTHER PUBLICATIONS

Extended European search report dated Jan. 13, 2021, in corresponding European patent Application No. 19766588.8, 7 pages.
Japanese Office Action dated Jan. 25, 2022, in Japanese Patent Application No. 2018-050230.

* cited by examiner

ELECTRONIC DEVICE, CHARGING CONTROL METHOD, AND COMPUTER PROGRAM

CROSS-REFERENCE TO RELATED APPLICATIONS

The present application is based on PCT filing PCT/JP2019/001126, filed Jan. 16, 2019, which claims priority to JP 2018-050230, filed Mar. 16, 2018, the entire contents of each are incorporated herein by reference.

TECHNICAL FIELD

The present disclosure relates to an electronic device, a charging control method, and a computer program.

BACKGROUND ART

In a secondary battery, such as a lithium-ion secondary battery, that is used in portable telephones, notebook personal computers, or the like, the repetition of charging and discharging results in deterioration in capacity. In order to solve such a problem, for example, Patent Document 1 discloses a secondary battery charging method for fully charging a secondary battery while a set voltage at which the secondary battery is charged is reduced in accordance with the repetition of charging and discharging of the secondary battery.

CITATION LIST

Patent Document

Patent Document 1: Japanese Patent Application Laid-Open No. 2008-005644

SUMMARY OF THE INVENTION

Problems to be Solved by the Invention

However, a progress condition of the deterioration of a secondary battery changes according to an environment, such as temperature, in which the secondary battery is being used. Therefore, in order to enable the secondary battery to be used until the end of an assumed battery life, it is requested that charging conditions be appropriately set in accordance with an environment in which the secondary battery has been used.

Accordingly, the present disclosure proposes an electronic device, a charging control method, and a computer program that are novel and have been improved and that enable a secondary battery to be used until the end of an assumed battery life by appropriately setting charging conditions in accordance with an environment in which the secondary battery has been used.

Solutions to Problems

According to the present disclosure, an electronic device is provided that includes: a measurement unit that measures an operation environment of a secondary battery; and a controller that reduces a charging voltage of the secondary battery by a predetermined amount, when the operation environment satisfies a predetermined condition.

Furthermore, according to the present disclosure, a charging control method is provided that includes: measuring, by a processor, an operation environment of a secondary battery; and reducing, by the processor, a charging voltage of the secondary battery by a predetermined amount, when the operation environment satisfies a predetermined condition.

Moreover, according to the present disclosure, a computer program is provided that causes a computer to perform: measuring an operation environment of a secondary battery; and reducing a charging voltage of the secondary battery by a predetermined amount, when the operation environment satisfies a predetermined condition.

Effects of the Invention

As described above, according to the present disclosure, an electronic device, a charging control method, and a computer program can be provided that are novel and have been improved and that enable a secondary battery to be used until the end of an assumed battery life by appropriately setting charging conditions in accordance with an environment in which the secondary battery has been used.

Note that the effect described above is not necessarily restrictive, and any of the effects described in the description or other effects that can be grasped from the description may be exhibited in addition to the effect described above or instead of the effect described above.

MODE FOR CARRYING OUT THE INVENTION

Figure 1:
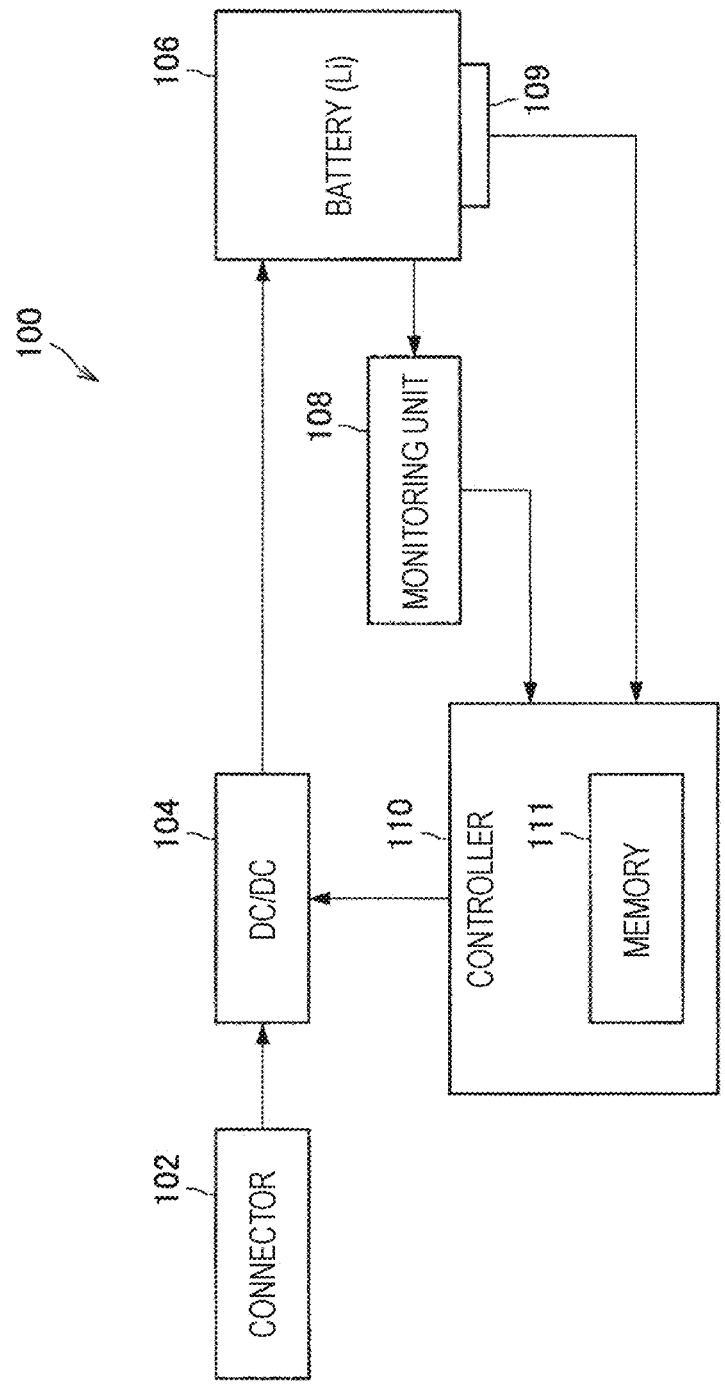
FIG. 1 is an explanatory diagram illustrating a functional configuration example of an electronic device according to an embodiment of the present disclosure.

A preferred embodiment of the present disclosure is described in detail below with reference to the attached drawings. Note that, in the description and the drawings, components that have substantially the same functional configuration are denoted by the same reference sign, and therefore a duplicate description is omitted.

Note that description is provided in the order described below.

1. Embodiment of the present disclosure
1.1. Circumstances
1.2. Configuration example
1.3. Operation example
2. Summary

1. EMBODIMENT OF THE PRESENT DISCLOSURE

[1.1. Circumstances]

First, circumstances leading to an embodiment of the present disclosure are described.

A secondary battery, such as a lithium-ion secondary battery, is used in portable telephones, notebook personal computers, or the like. In a lithium-ion secondary battery, the repetition of charging and discharging results in deterioration in capacity. Accordingly, as described above, a secondary battery charging method has been proposed for fully charging a secondary battery while a set voltage at which the secondary battery is charged is reduced in accordance with the repetition of charging and discharging of the secondary battery.

Furthermore, when the lithium-ion secondary battery is used in an environment of a high temperature or a low temperature, deterioration in capacity or expansion occurs, and safety deteriorates. A progress condition of the deterioration of the lithium-ion secondary battery changes according to the environment of the lithium-ion secondary battery. If the lithium-ion secondary battery is frequently used in the environment of a high temperature or a low temperature, the deterioration in capacity or expansion progresses fast in comparison with the case of usage in such an environment. A secondary battery has a battery life that has been assumed in advance. In order to enable the secondary battery to be used until the end of the assumed battery life, it is requested that charging conditions be appropriately set in accordance with the environment of the secondary battery. Note that it is assumed that a battery life refers to a period from the start of usage to a reduction in capacity to a predetermined ratio.

Accordingly, in view of the point described above, a person who makes the present disclosure has earnestly studied a technology that enables a secondary battery to be used until the end of an assumed battery life by appropriately setting charging conditions in accordance with the environment of the secondary battery. As a result, the person who makes the present disclosure has devised the technology that enables the secondary battery to be used until the end of the assumed battery life by appropriately setting charging conditions in accordance with the environment of the secondary battery, as described below.

The circumstances leading to the embodiment of the present disclosure have been described above. Next, the embodiment of the present disclosure is described in detail.

[1.2. Configuration Example]

FIG. 1 is an explanatory diagram illustrating a functional configuration example of an electronic device according to the embodiment of the present disclosure. A functional configuration example of the electronic device according to the embodiment of the present disclosure is described with reference to FIG. 1.

As illustrated in FIG. 1, an electronic device 100 according to the embodiment of the present disclosure includes a connector 102, a DC/DC converter 104, a battery 106, a monitoring unit 108, a temperature sensor 109, and a controller 110. The electronic device 100 is a device that operates by using power stored in a secondary battery, such as a smartphone, a tablet portable terminal, a personal computer, a portable game machine, a portable music reproducing device, a wearable device, or a head-mounted display, for example.

The connector 102 is a connector that connects, for example, a universal serial bus (USB) cable or another cable. For example, when a cable that has been connected to a device, such as a charger, that supplies power to the electronic device 100 is connected to the connector 102, power is supplied from the device via the DC/DC converter 104 to the battery 106.

The DC/DC converter 104 converts a voltage of direct-current power supplied from the connector 102 into a voltage that is suitable for charging of the battery 106. A voltage value into which the DC/DC converter 104 will perform conversion is controlled by the controller 110. In the present embodiment, the controller 110 determines the voltage value into which the DC/DC converter 104 will perform conversion, by using a result of monitoring a voltage supplied to the battery 106 and a result of monitoring the temperature of the battery 106.

The battery 106 is a secondary battery such as a lithium-ion secondary battery, for example. Power stored in the battery 106 is supplied to each unit inside the electronic device 100.

The monitoring unit 108 monitors the voltage of power supplied from the DC/DC converter 104 to the battery 106. A voltage value monitored by the monitoring unit 108 is transmitted to the controller 110. The temperature sensor 109 is configured, for example, by a thermistor, and detects the temperature of the battery 106. A temperature value detected by the temperature sensor 109 is transmitted to the controller 110. The monitoring unit 108 and the temperature sensor 109 may function as an example of a measurement unit of the present disclosure.

By controlling the voltage value into which the DC/DC converter 104 will perform conversion, on the basis of the voltage value monitored by the monitoring unit 108 and the temperature value detected by the temperature sensor 109, the controller 110 controls a charging voltage of the battery 106. The controller 110 may function as an example of a controller according to the present disclosure. The controller 110 internally holds a memory 111. The memory 111 stores information relating to the voltage value monitored by the monitoring unit 108 and the temperature value detected by the temperature sensor 109, together with its monitoring or detection time.

More specifically, the controller 110 converts an operation time period of the battery 106 at the temperature value detected by the temperature sensor 109 into an operation time period at a predetermined temperature, and calculates an integrated value of a time period after conversion. The controller 110 may perform this conversion, for example, by dividing the operation time period by a coefficient (a temperature coefficient) where the predetermined temperature described above has a coefficient of 1.

Then, when the integrated value has reached a predetermined value, the controller 110 performs control to reduce the voltage value into which the DC/DC converter 104 will perform conversion by a predetermined number. By reducing the voltage value into which the DC/DC converter 104 will perform conversion by the predetermined number, the controller 110 can reduce the charging voltage of the battery 106 by a predetermined amount.

A plurality of predetermined values may be set. For example, when the integrated value has reached a first predetermined value, the controller 110 may perform control to reduce the voltage value into which the DC/DC converter 104 will perform conversion by the predetermined number. When the integrated value has reached a second predetermined value that is greater than the first predetermined value, and the controller 110 may perform control to further reduce the voltage value into which the DC/DC converter 104 will perform conversion by the predetermined number.

Note that, in the example illustrated in FIG. 1, the DC/DC converter 104 and the controller 110 are illustrated as different blocks, but the controller 110 and the DC/DC converter 104 may be provided on the same chip.

The electronic device 100 according to the embodiment of the present disclosure has the configuration illustrated in FIG. 1 to enable a secondary battery to be used until the end of an assumed battery life by appropriately setting charging conditions (a voltage value into which the DC/DC converter 104 will perform conversion) of the battery 106 in accordance with the environment of the battery 106.

Figure 2:
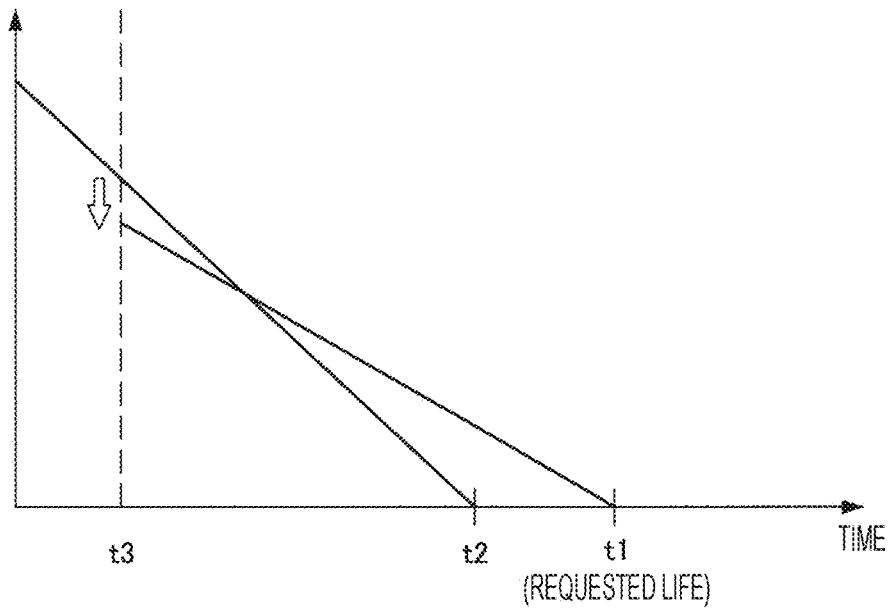
FIG. 2 is an explanatory diagram illustrating a concept of a change in a battery life of a battery.

FIG. 2 is an explanatory diagram illustrating a concept of a change in the battery life of the battery 106 according to the appropriate setting of the charging conditions of the battery 106 in the electronic device 100 according to the embodiment of the present disclosure.

It is assumed, for example, that setting has been performed in such a way that the battery life of the battery 106 will end at point t1 in time. However, if it is discovered, at point t3 in time, on the basis of the environment of the battery 106 (a temperature detected by the temperature sensor 109) that the battery life of the battery 106 will end at t2 earlier than t1, the controller 110 performs control at this point t3 in time to reduce the voltage value into which the DC/DC converter 104 will perform conversion in such a way that the battery life of the battery 106 will end at point t1 in time.

The functional configuration example of the electronic device 100 according to the embodiment of the present disclosure has been described above. Next, an operation example of the electronic device 100 according to the embodiment of the present disclosure is described.

[1.3. Configuration Example]

Figure 3:
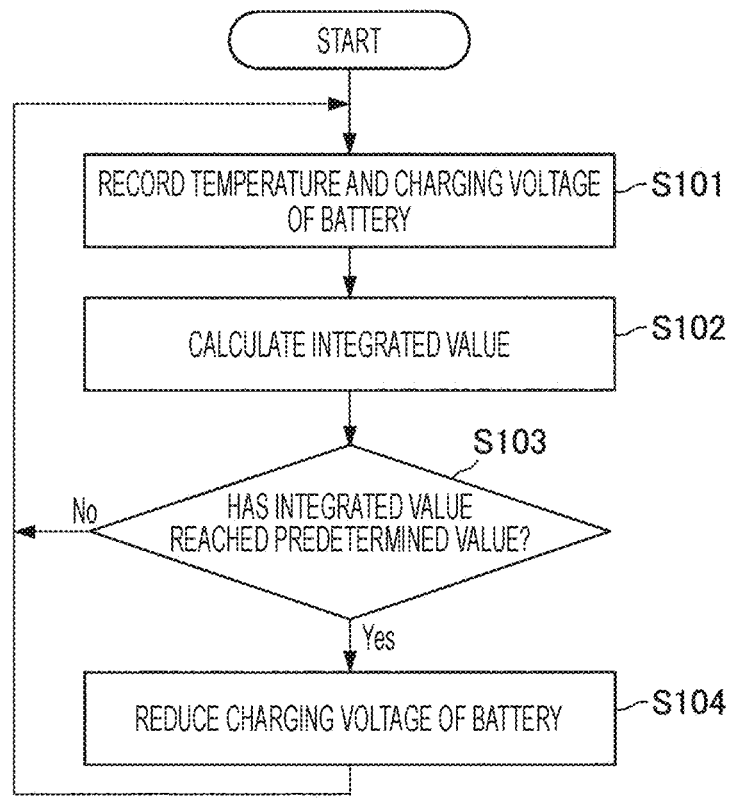
FIG. 3 is a flowchart illustrating an operation example of the electronic device according to the embodiment of the present disclosure.

FIG. 3 is a flowchart illustrating an operation example of the electronic device 100 according to the embodiment of the present disclosure. FIG. 3 illustrates an example of an operation performed by the electronic device 100 to appropriately set charging conditions of the battery 106 in accordance with the environment of the battery 106. The operation example of the electronic device 100 according to the embodiment of the present disclosure is described below with reference to FIG. 3.

The electronic device 100 regularly records the temperature of the battery 106 and the charging voltage of the battery 106 while power is supplied and an operation is performed (step S101). This recording process of step S101 is performed, for example, by the controller 110. The controller 110 stores, in the memory 111, information relating to a voltage value monitored by the monitoring unit 108 and a temperature value detected by the temperature sensor 109.

Next, the electronic device 100 converts a time period during which the battery 106 has operated at a recorded temperature into an operation time period at a predetermined temperature, and calculates an integrated value of a time period after this conversion (step S102). This calculation process of step S102 is performed, for example, by the controller 110.

As described above, the controller 110 converts an operation time period of the battery 106 at a temperature value detected by the temperature sensor 109 into an operation time period at a predetermined temperature, and calculates an integrated value of a time period after this conversion. The controller 110 may perform this conversion, for example, by dividing the operation time period by a coefficient (a temperature coefficient) where the predetermined temperature described above has a coefficient of 1.

Figure 4:
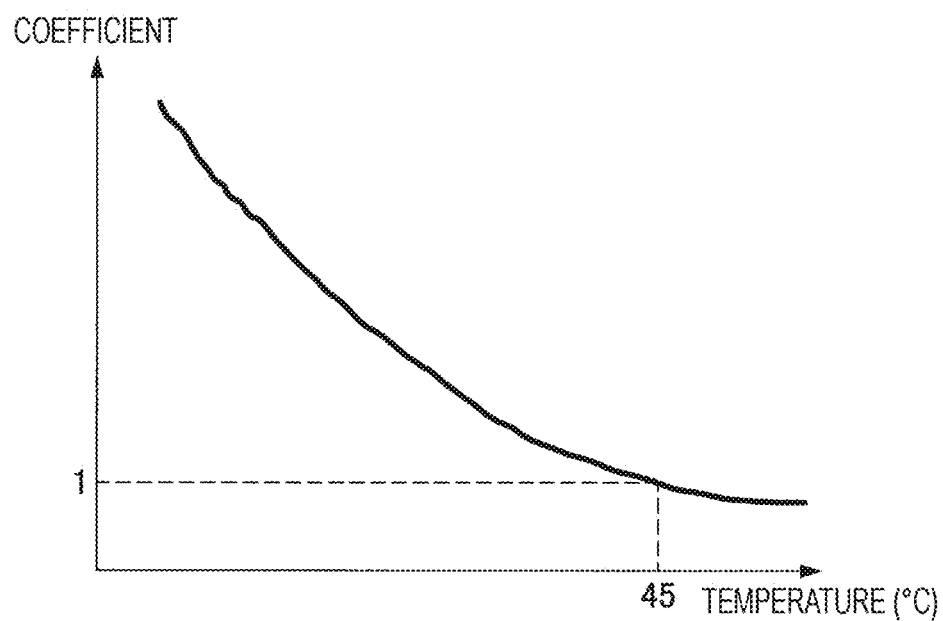
FIG. 4 is an explanatory diagram illustrating, as a graph, an example of a relationship between the temperature of a battery that has been detected by a temperature sensor and a temperature coefficient.

FIG. 4 is an explanatory diagram illustrating, as a graph, an example of a relationship between a temperature of the battery 106 that has been detected by the temperature sensor 109 and a temperature coefficient. In the example illustrated in FIG. 4, a temperature coefficient at 45 degrees Celsius is set to 1, a temperature coefficient is reduced if the temperature is above 45 degrees, and the temperature coefficient is increased if the temperature is above 45 degrees Celsius. The controller 110 can calculate an integrated value obtained by performing conversion into an operation time period at 45 degrees Celsius, by using the temperature coefficient that has been set as described above.

Next, the electronic device 100 determines whether or not the integrated value has reached a predetermined value (step S103). This determination process of step S103 is performed, for example, by the controller 110. If the integrated value has not reached the predetermined value (step S103, No), the electronic device 100 returns to the process of step S101.

In contrast, if the integrated value has reached the predetermined value (step S103, Yes), the electronic device 100 reduces the charging voltage of the battery 106 by a predetermined amount (step S104). This process of step S104 is performed by the controller 110 controlling the DC/DC converter 104 to reduce a voltage value into which the DC/DC converter 104 will perform conversion. Then, when the charging voltage of the battery 106 is reduced by the predetermined amount in step S104, the electronic device 100 returns to the process of step S101.

By performing the operation illustrated in FIG. 4 to appropriately set charging conditions (a voltage value into which the DC/DC converter 104 will perform conversion) of the battery 106 in accordance with the environment of the battery 106, the electronic device 100 according to the embodiment of the present disclosure enables the battery 106 to be used until the end of an assumed battery life.

The electronic device 100 according to the embodiment of the present disclosure may cause the controller 110 to record the number of times of charging the battery 106 in a predetermined environment, and may set the charging conditions of the battery 106 on the basis of the number of times of charging. The number of times of charging may be counted up by 1 if the battery 106 is charged up to the capacity of the battery 106. An example is the number of times of charging the battery 106 in each of the temperature sections of a low temperature, an ordinary temperature, and a high temperature serving as examples of the predetermined environment. The low temperature may fall within, for example, a temperature range from 20 degrees Celsius to 30 degrees Celsius, the ordinary temperature may fall within, for example, a temperature range from 30 degrees Celsius to 40 degrees Celsius, and the high temperature may fall within, for example, a temperature range of 40 degrees Celsius or higher. Needless to say, the temperature ranges of the low temperature, the ordinary temperature, and the high temperature are not limited to the examples described above, and the number of temperature sections is not limited to 3.

Furthermore, in setting the charging voltage of the battery 106, the electronic device 100 according to the embodiment of the present disclosure may use a coefficient (a voltage coefficient) relating to the charging voltage of the battery 106 in addition to the coefficient described above (the temperature coefficient) relating to the temperature of the battery 106. For example, a voltage coefficient at a time when the charging voltage of the battery 106 is a predetermined voltage may be set to 1, a voltage coefficient may be reduced if the charging voltage is higher than the predetermined voltage, and the voltage coefficient may be increased if the charging voltage is higher than the predetermined voltage.

Figure 5:
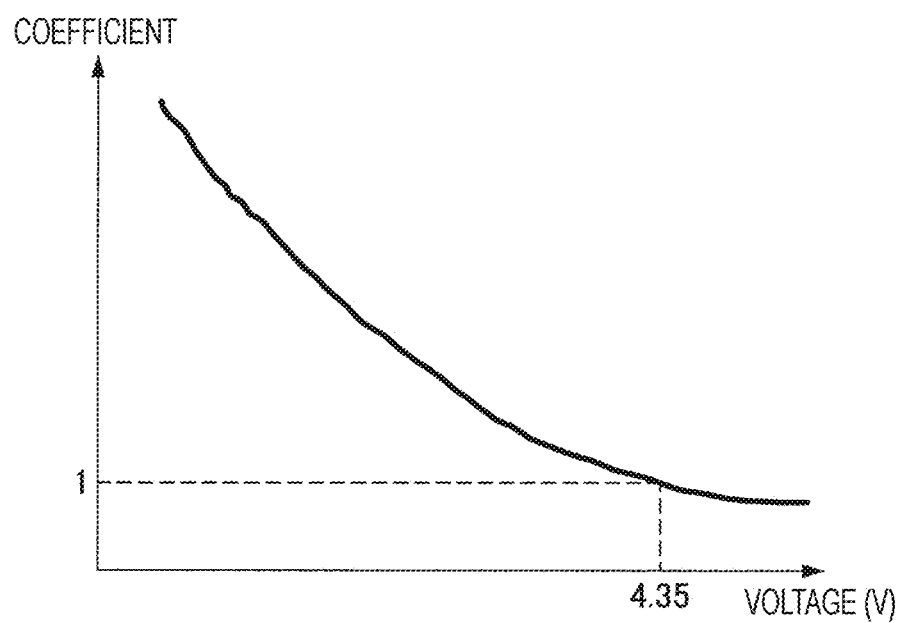
FIG. 5 is an explanatory diagram illustrating, as a graph, an example of a relationship between a charging voltage of a battery that is monitored by a monitoring unit and a voltage coefficient.

FIG. 5 is an explanatory diagram illustrating, as a graph, an example of a relationship between a charging voltage of the battery 106 that is monitored by the monitoring unit 108 and a voltage coefficient. In the example illustrated in FIG. 5, a voltage coefficient at the time of a voltage of 4.35 V is set to 1, a voltage coefficient is reduced if a voltage is higher than 4.35 V, and the voltage coefficient is increased if the voltage is higher than 4.35 V. Needless to say, a voltage value at a time when the voltage coefficient is 1 is not limited to the example described above. The controller 110 can calculate an integrated value obtained by performing conversion into an operation time period at 4.35 V, by using the temperature coefficient that has been set as described above. Then, the controller 110 may determine whether or not an integrated value of an operation time period has reached a predetermined time period, by using the integrated value obtained by performing conversion into the operation time period at 45 degrees Celsius and the integrated value obtained by performing conversion into the operation time period at 4.35 V.

Stated another way, even if the battery 106 has the same temperature and the same operation time period, the integrated value changes between a case where the charging voltage of the battery 106 is 4.35 V and a case where the charging voltage of the battery 106 is 4.25 V, and the integrated value is smaller in the case of 4.25 V.

Figure 6:
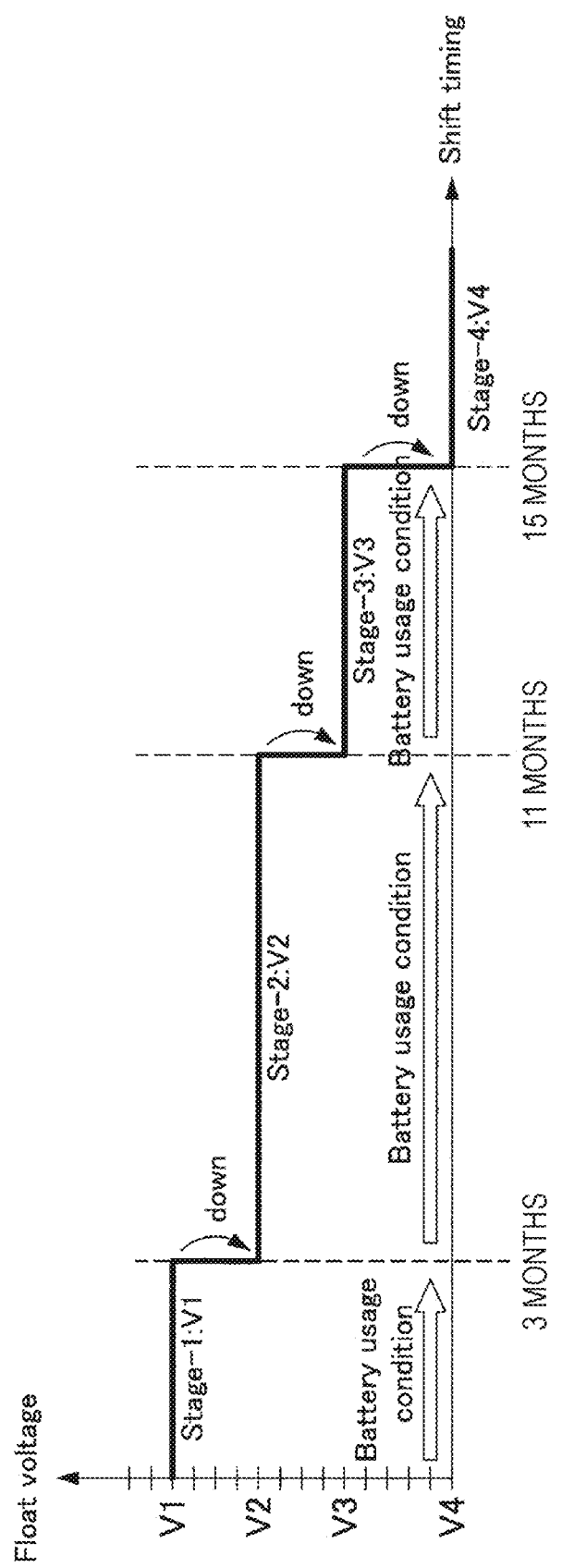
FIG. 6 is an explanatory diagram illustrating an operation of the electronic device according to the embodiment of the present disclosure.

FIG. 6 is an explanatory diagram illustrating an operation of the electronic device 100 according to the embodiment of the present disclosure. In the electronic device 100, the charging voltage of the battery 106 is set to a predetermined value V1 until the integrated value of the operation time period reaches a predetermined time period. If it is determined, for example, 3 months after the start of usage that the integrated value of the operation time period has reached the predetermined time period, the electronic device 100 reduces the charging voltage of the battery 106 to V2 that is lower than V1. Moreover, if it is determined, for example, 11 months after the start of usage that the integrated value of the operation time period has reached the predetermined time period, the electronic device 100 further reduces the charging voltage of the battery 106 to V3 that is lower than V2. Moreover, if it is determined, for example, 15 months after the start of usage that the integrated value of the operation time period has reached the predetermined time period, the electronic device 100 further reduces the charging voltage of the battery 106 to V4 that is lower than V3.

The electronic device 100 according to the embodiment of the present disclosure can perform an operation to reduce a charging voltage applied to the battery 106 at a point in time when predetermined conditions are satisfied, as illustrated in FIG. 6. Then, by performing the operation to reduce the charging voltage applied to the battery 106 at the point in time when the predetermined conditions are satisfied, the electronic device 100 according to the embodiment of the present disclosure enables the battery 106 to be used until the end of an assumed battery life.

2. SUMMARY

As described above, according to the embodiment of the present disclosure, the electronic device 100 can be provided that enables an internally included secondary battery to be used until the end of an assumed battery life by appropriately setting charging conditions in accordance with an environment in which the secondary battery has been used.

Respective steps in processing performed by each device in the description do not always need to be performed in time series in the order described as a sequence diagram or a flowchart. For example, the respective steps in the processing performed by each of the devices may be performed in an order that is different from the order described as the flowchart, or may be performed in parallel.

In addition, a computer program can also be generated that causes hardware, such as a CPU, a ROM, or a RAM, that is incorporated into each of the devices to exhibit functions that are similar to functions of the configuration described above of each of the devices. Further, a storage medium in which the computer program has been stored can also be provided. Furthermore, a series of processes can be implemented by hardware, by configuring each of the functional blocks illustrated in the functional block diagram by using hardware.

A preferred embodiment of the present disclosure has been described in detail above with reference to the attached drawings, but the technical scope of the present disclosure is not limited to the example described above. It is obvious that a person with ordinary skill in the art to which the present disclosure pertains could conceive a variety of variations or modifications without departing from a technical idea described in the claims, and it should be understood that the variations or modifications fall under the technical scope of the present disclosure.

Furthermore, effects described herein are only exemplary or illustrative, and are not restrictive. Stated another way, a technology according to the present disclosure can exhibit other effects that would be obvious to those skilled in the art from the description provided herein in addition to the effects described above or instead of the effects described above.

Note that the configuration described below also falls under the technical scope of the present disclosure.

(1)

An electronic device including:

a measurement unit that measures an operation environment of a secondary battery; and a controller that reduces a charging voltage of the secondary battery by a predetermined amount, when the operation environment satisfies a predetermined condition.

(2)

The electronic device described in (1) described above, in which the measurement unit measures, as the operation environment, a temperature of the secondary battery.

(3)

The electronic device described in (1) or (2) described above, in which the measurement unit measures, as the operation environment, a voltage of power supplied to the secondary battery.

(4)

The electronic device described in any of (1) to (3) described above, in which the controller reduces the charging voltage of the secondary battery by the predetermined amount, when an integrated value satisfies a predetermined condition, the integrated value being obtained by converting an operation time period in the operation environment measured by the measurement unit into an operation time period in a predetermined operation environment and by performing integration.

(5)
The electronic device described in (4) described above, in which the controller performs conversion into the operation time period in the predetermined operation environment, by using a temperature coefficient using a predetermined temperature as a reference.

(6)
The electronic device described in (4) or (5) described above, in which the controller performs conversion into the operation time period in the predetermined operation environment, by using a voltage coefficient using a predetermined voltage as a reference.

(7)
The electronic device described in any of (1) to (6) described above, in which the controller reduces the charging voltage of the secondary battery by the predetermined amount, when the operation environment satisfies the predetermined condition and a number of times of charging the secondary battery satisfies a predetermined condition.

(8)
The electronic device described in any of (1) to (7) described above, in which the secondary battery includes a lithium-ion secondary battery.

(9)
A charging control method including:
measuring, by a processor, an operation environment of a secondary battery; and
reducing, by the processor, a charging voltage of the secondary battery by a predetermined amount, when the operation environment satisfies a predetermined condition.

(10)
A computer program that causes a computer to perform:
measuring an operation environment of a secondary battery; and
reducing a charging voltage of the secondary battery by a predetermined amount, when the operation environment satisfies a predetermined condition.

REFERENCE SIGNS LIST

100 Electronic device
102 Connector
104 DC/DC converter
106 Battery
108 Monitoring unit
109 Temperature sensor
110 Controller
111 Memory

The invention claimed is:

1. An electronic device comprising:
measurement circuitry that measures an operation environment of a secondary battery of the electronic device; and
a controller that reduces a charging voltage of the secondary battery by a plurality of predetermined amounts, when the operation environment satisfies a predetermined condition that indicates life of the secondary battery is expected to end prior to a previously identified battery life of the secondary battery,
wherein the measurement circuitry measures, as the operation environment of the secondary battery, a voltage of power supplied to the secondary battery and a temperature of the secondary battery,
wherein the controller reduces the charging voltage of the secondary battery by the plurality of predetermined amounts according to successive downward steps of constant voltage, and
wherein a first duration of at least one of the downward steps of constant voltage for the reducing charging voltages is different from a second duration of at least one other of the downward steps of constant voltage for the reducing charging voltages.

2. The electronic device according to claim 1, wherein the controller reduces the charging voltage of the secondary battery by each of the predetermined amounts, when an integrated value satisfies a predetermined condition, the integrated value being obtained by converting an operation time period in the operation environment measured by the measurement circuitry into an operation time period in a predetermined operation environment and by performing integration.

3. The electronic device according to claim 2, wherein the controller performs conversion into the operation time period in the predetermined operation environment, by using a temperature coefficient using a predetermined temperature as a reference.

4. The electronic device according to claim 2, wherein the controller performs conversion into the operation time period in the predetermined operation environment, by using a voltage coefficient using a predetermined voltage as a reference.

5. The electronic device according to claim 1, wherein the controller reduces the charging voltage of the secondary battery by each of the predetermined amounts, when the operation environment satisfies the predetermined condition and a number of times of charging the secondary battery satisfies a predetermined condition.

6. The electronic device according to claim 1, wherein the secondary battery includes a lithium-ion secondary battery.

7. The electronic device according to claim 1, wherein at least one of the plurality of predetermined amounts of voltage is different from at least one other of the plurality of predetermined amounts of voltage.

8. A charging control method comprising:
measuring, using a processor, an operation environment of a secondary battery of an electronic device; and
reducing, using the processor, a charging voltage of the secondary battery by a plurality of predetermined amounts, when the operation environment satisfies a predetermined condition that indicates life of the secondary battery is expected to end prior to a previously identified battery life of the secondary battery, wherein said reducing reduces the charging voltage of the secondary battery by the plurality of predetermined amounts according to successive downward steps of constant voltage; and
repeating, using the processor, said measuring and said reducing for each successive downward step,
wherein said measuring measures, as the operation environment of the secondary battery, a voltage of power supplied to the secondary battery and/or a temperature of the secondary battery, and
wherein a first duration of at least one of the downward steps of constant voltage for the reducing charging voltages is different from a second duration of at least one other of the downward steps of constant voltage for the reducing charging voltages.

9. The charging control method according to claim 8, wherein said reducing the charging voltage of the secondary battery by each of the predetermined amounts occurs responsive to an integrated value satisfying a predetermined condition, the integrated value being obtained by converting an operation time period in the measured operation environment into an operation time period in a predetermined operation environment and by performing integration.

10. The charging control method according to claim 8, wherein the said reducing the charging voltage of the secondary battery by each of the predetermined amounts occurs responsive to the operation environment satisfying the predetermined condition and a number of times of charging the secondary battery satisfies a predetermined condition.

11. The charging control method according to claim 8, wherein the secondary battery is a lithium-ion secondary battery.

12. The charging control method according to claim 8, wherein at least one of the plurality of predetermined amounts of voltage is different from at least one other of the plurality of predetermined amounts of voltage.

13. A non-transitory computer-readable storage medium having stored thereon instructions that, when executed by one or more processors, causes the one or more processors to perform a method comprising:
   measuring an operation environment of a secondary battery of an electronic device;
   reducing a charging voltage of the secondary battery by a plurality of predetermined amounts, when the operation environment satisfies a predetermined condition that indicates life of the secondary battery is expected to end prior to a previously identified battery life of the secondary battery, wherein said reducing reduces the charging voltage of the secondary battery by the plurality of predetermined amounts according to successive downward steps of constant voltage; and
   repeating said measuring and said reducing for each successive downward step,
   wherein said measuring measures, as the operation environment of the secondary battery, a voltage of power supplied to the secondary battery and a temperature of the secondary battery, and
   wherein a first duration of at least one of the downward steps of constant voltage for the reducing charging voltages is different from a second duration of at least one other of the downward steps of constant voltage for the reducing charging voltages.

14. The non-transitory computer-readable storage medium according to claim 13, wherein said reducing the charging voltage of the secondary battery by each of the predetermined amounts occurs under a condition that an integrated value satisfying a predetermined condition, the integrated value being obtained by converting an operation time period in the measured operation environment into an operation time period in a predetermined operation environment and by performing integration.

15. The non-transitory computer-readable storage medium according to claim 13, wherein the said reducing the charging voltage of the secondary battery by each of the predetermined amounts occurs under a condition that the operation environment satisfying the predetermined condition and a number of times of charging the secondary battery satisfies a predetermined condition.

16. The non-transitory computer-readable storage medium according to claim 13, wherein at least one of the plurality of predetermined amounts of voltage is different from at least one other of the plurality of predetermined amounts of voltage.

* * * * *